Dec. 7, 1937.  S. M. CREWDSON  2,101,242

CLUTCH

Original Filed April 15, 1935

Inventor:
Sarah M Crewdson
By Wilkinson, Huxley, Byron & Knight
Attys

Patented Dec. 7, 1937

2,101,242

UNITED STATES PATENT OFFICE 2,101,242

CLUTCH

Sarah M. Crewdson, Chicago, Ill., assignor of nineteen-thirtieths to Robert H. Goodhart and three-thirtieths to Herman M. Soloway, Chicago, Ill.

Original application April 15, 1935, Serial No. 16,362. Divided and this application August 8, 1935, Serial No. 35,230

7 Claims. (Cl. 74—142)

The invention relates to clutch mechanism and in its illustrated form is particularly adapted for transmitting reciprocating or oscillating movement into rotary uni-directional motion.

The present clutch has been found useful in many arts but for illustrative purposes its adaptability to sewing machine attachments such as shown in applicant's copending application Serial No. 16,362 filed April 15, 1935 may be particularly mentioned. Devices of this character are designed for cutting cloth and other material during the sewing thereof and when driven from the reciprocating needle bar of the machine, require an adjustable clutch to synchronize the rotary speed of the cutter with the travel of the material through the machine. The adjustability of the clutch in devices of this nature is of prime importance and the variable capacity of the present clutch has been found adequate and has the further advantage that adjustability may be effected during operation without stopping the machine.

The clutch of the invention will fulfill all requirements where it is desired to transform reciprocating or oscillating movement into rotary motion of an intermittent character and having the same direction of rotation. It is accordingly an object of the invention to provide a clutch of this character which will be adjustable within a wide range and which will therefore permit a variation in the speed of the resulting rotary motion. Specifically, it is possible to set the adjustable mechanism of the clutch so that the rotary motion will cease while the driving impulses to the clutch continue or to secure by an opposite setting of the mechanism the maximum rotary movement for the particular driving impulse.

A further object of the invention is to provide a clutch adapted to be interposed between an oscillating member and a rotatably mounted shaft and which will include clutch members having adjustability to vary the extent of the rotary motion imparted to said shaft.

With these and various other objects in view the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1:
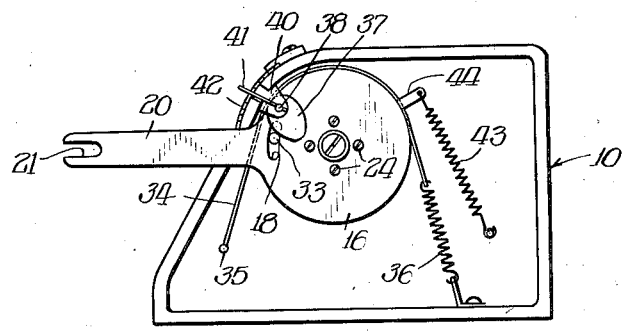
Figure 1 is an elevational view of one embodiment of the clutch having applied thereto manual means for setting the adjustable clutch members.
Figure 3:
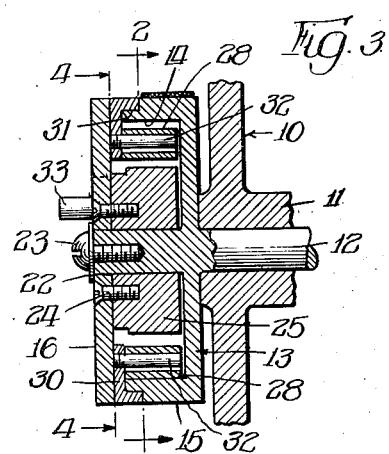
Figure 3 is a sectional view taken substantially along line 3—3 of Figure 2.
Figure 4:
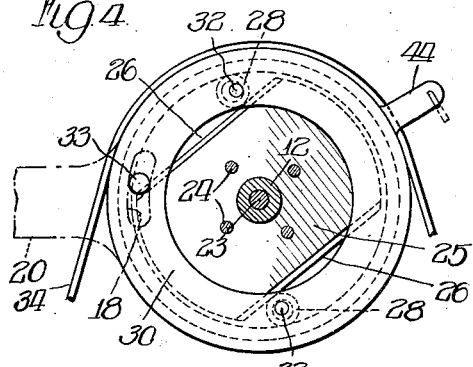
Figure 4 is a view substantially similar to Figure 2.

Referring to Figure 1 of the drawing, the support journaling the rotatable shaft having associated therewith the present clutch is identified by numeral 10, it being understood that said support may take any desired form and may in some instances comprise the frame of the machine incorporating the clutch of the invention. Said frame, as shown in Figure 3, is provided with a hub 11 which journals a rotatable shaft 12. Said shaft may be considered as the driven member and on one side of the frame has formed integral therewith or otherwise suitably secured the drum 13 having one closed end. The drum preferably has a smooth interior surface represented by numeral 14 and a smooth exterior surface 15.

The shaft 12 extends through the end wall of the drum and terminates a short distance beyond the drum. Rotatably mounted on this projecting end of shaft 12 is the disc 16 comprising the driving member and which has an arcuate slot 18 formed therein for purposes which will be presently described. Integral with the disc 16 is the extension or arm 20 which may be bifurcated at 21, as shown in Figure 1. As previously stated, the disc has independent rotation on the projecting end of shaft 12, being held to said shaft by the retaining washer 22 and screw 23 which is threaded into the end of the shaft. Suitably secured by screws 24 to the inside surface of the disc 16 and located within the drum is a rectangular block 25, preferably having opposed flat surfaces 26 and arcuate surfaces 27 on the respective ends thereof.

Figure 5:
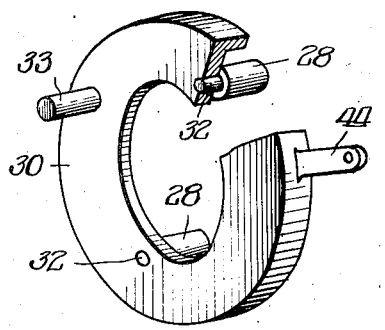
Figure 5 is a perspective view of the adjustable clutch ring, with parts broken away to more clearly show the clutch rollers.

Interposed between the disc 16 and the drum 13 are a plurality of clutch members in the form of rollers 28. Said rollers are carried by a clutch ring 30, Figure 5, substantially L-shaped in cross section and which is mounted for rotation on the periphery of the drum 13. Said drum is provided with stepped surfaces forming a portion 31 of reduced diameter which receives the short leg of the clutch ring 30 supporting said ring on the drum and which permits free rotation of said ring with respect thereto. The rollers 28 are loosely carried by studs 32 having threaded connection to said ring, as clearly shown in Figures 3 and 5. When the clutch ring is in position on the drum the studs 32 are horizontally positioned, locating the rollers in parallelism with the interior surface 14 of the drum. It will be observed that the studs and rollers have a length so that they just terminate short of the wall of the drum as otherwise the clutch ring 30 would not have free movement with respect to the drum.

From the foregoing description it will be observed that the drum forms one element of the present clutch structure and which is carried by a rotatable shaft having a fixed connection therewith. The clutch ring is in turn carried by said drum in a manner permitting independent movement on the drum and which is at all times concentric with respect to the drum so that the rollers 28 are normally spaced from the interior surface 14 and which is uniform for any position of the clutch ring. The disc 16 may rotate on the end of shaft 12 and the movement of the same is independent of both the drum and the clutch ring. Said disc is adapted to have oscillating movement which may be imparted to arm 20 by any suitable mechanism such as a reciprocating member having connection with the end of said arm by means of the bifurcation 21 formed therein. The specific manner or means employed for oscillating arm 20 is not to be construed as limiting the invention, as the motion of said means, whatever it may be, will be transformed by the present clutch into rotary motion of an intermittent nature but in the same direction.

Figure 2:
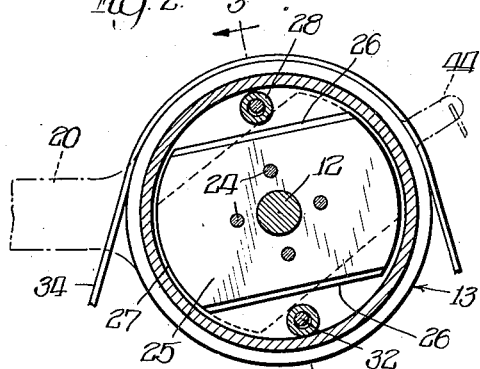
Figure 2 is a sectional view showing the interior mechanism of the clutch.

In operation the block 25 will oscillate with the disc 16 as the same is secured thereto and with the rollers positioned as shown in Figure 2, it will be observed that when the block reaches its dotted line position camming of the rollers into contact with the interior surface of the drum will result. Further downward movement of arm 20 will carry the drum along with the block since the rollers will be wedged between these parts and therefore rotation of shaft 12 will take place and which will be commensurate with the extent of said further downward movement of the arm. The position of the rollers can be changed by rotation of the clutch ring 30 on the drum and this may be conveniently accomplished by movement of the pin 33 which projects through opening 18 in said disc. In the event the clutch ring is given clockwise rotation, Figure 2, the result will be to cause camming of the rollers in the early part of the down stroke of the arm 20 or oscillation of disc 16. The result, therefore, will be to increase the extent of rotation of the shaft 12. Conversely, if the clutch ring is rotated counterclockwise the rollers will be located so that their engagement with the block 25 will occur late in the down stroke of the arm and the extent of the oscillating movement imparted to the shaft will be correspondingly reduced. Upon upward movement of the arm 20 the rollers will be automatically released and thus this upward movement of the arm is not imparted to the shaft. To further insure against reverse rotation of the shaft 12 it is proposed to employ a friction brake band designated 34, which may be fixed at one end to the frame 10 as at 35, and yieldingly secured at its other end by the coil spring 36, the intermediate section of the band passing over and engaging the exterior surface 15 of the drum. The drum is therefore frictionally held by the band, which, however, permits rotation of the drum caused by the block 25 forcing the rollers into positive engagement therewith but which will hold the drum against reverse rotation.

Means for adjusting the clutch ring 30 may take the form of an eccentric cam 37, Figure 1, carried by the journalling pin 38, mounted for rotation in member 40 depending from the frame 10. Fixed to said pin is a lever 41 having contact with an arcuate plate 42 suitably fixed to said support and which may carry indicia thereon indicating the particular adjustment of the clutch for any position of lever 41. Movement of the lever will rotate the arcuate cam 37, which has engagement with pin 33 extending from the clutch ring 30. By means of the coil spring 43 fixed to the support and to projection 44 extending from the clutch ring, the ring is resiliently biased in a clockwise direction to hold the pin 33 in contact with the eccentric cam. Therefore, upon rotation of the cam the clutch ring will be caused to rotate to vary the location of the rollers 28 and it will be appreciated that these rollers can therefore be located in an infinite number of positions. The present clutch is therefore capable of driving the rotatable shaft 12 at any speed within its range, assuming that oscillations of the arm 20 take place at a constant speed.

A feature of the operation of the present clutch concerns the oscillating movement of the clutch ring 30, the magnitude of the oscillation of this ring in any one direction being equal to the intermittent rotation imparted to shaft 12 thereby. The coil spring 43, which holds the ring biased in a counterclockwise direction, Fig. 2, thus maintaining the pin 33 against the cam 37, is effective in returning the ring to initial position. It is desirable that the rollers 28 have a loose mounting on the studs 32 as this enables a more effective camming of the rollers with the interior surface of the drum. As previously stated, any means may be employed for oscillating arm 20 and likewise the intermittently rotating shaft 12 will have connection with other mechanism or may be used directly as a driven member.

Figure 6:
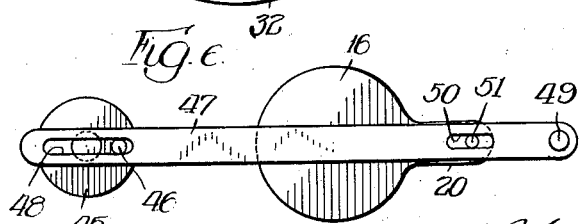
Figure 6 is a diagrammatic view illustrating one arrangement for driving the actuating member of the clutch from rotating means.

In Figure 6 a modified arrangement of the clutch and driving means therefor is disclosed. The latter may consist of a rotating driving wheel 45 having the eccentric pin 46 associated with the lever 47 which in this instance is provided with an elongated slot 48 for receiving said pin. Rotation of wheel 45 will result in up and down oscillations of lever 47. The arm is pivoted to any suitable support at 49 and is provided with a second elongated slot 50 receiving the pin 51 which extends from the arm 20, projecting from and integral with the disc 16 of the clutch. It will be observed that the arm 20 in this arrangement projects in an opposite direction from that shown in Figure 1 but the oscillations of the same caused by lever 47 will be in turn transformed by the clutch into rotary motion of shaft 12. Thus, with respect to the structure of Figure 6, the driving member may be considered as the rotating wheel 45 which motion is converted by the clutch into intermittent rotation of shaft 12 and which can be varied as to speed by varying the position of the clutch ring 30. This adjustability to change the speed of the driven shaft has the further advantage that the same can be effected without stopping the operation of the clutch.

The invention is not to be limited to or by details of construction of the particular embodiment thereof illustrated by the drawing, as various other forms of the device will of course be apparent to those skilled in the art without departing from the spirit of the invention or the scope of the claims.

This application is a divisional of my copending application Serial No. 16,362 filed April 15, 1935.

What is claimed is:

1. A device for converting oscillating motion into intermittent rotary motion comprising a rotatable shaft, a clutch member of generally cup-shape fixed thereto and rotating therewith, a clutch ring having rotation independently of the clutch member and positioned adjacent thereto, clutch rollers carried by said ring and located within the member, resilient means yieldingly biasing said ring in a direction to hold the ring against a stop, and means within the member having oscillating motion, said means being operative to cam the rollers into engagement with the internal periphery of the clutch member when oscillated in a direction opposite to the direction in which the clutch ring is yieldingly biased.

2. A device for converting oscillating motion into intermittent rotary motion comprising a rotatable shaft, a clutch member of generally cup-shape fixed thereto and rotating therewith, a clutch ring having rotation independently of the clutch member and positioned adjacent thereto, clutch rollers carried by said ring and located within the member, resilient means yieldingly biasing said ring in a direction to hold the ring against an adjustable stop, means within the member having oscillating motion, said means being operative to cam the rollers into engagement with the internal periphery of the clutch member when oscillated in a direction opposite to the direction in which the clutch ring is yieldingly biased, and manual means for adjusting said stop which thereby determines the initial position of the clutch rollers.

3. A device for converting oscillating motion into intermittent rotary motion including a support having a shaft mounted for rotation therein and adapted to be driven, an oscillating member journalled by said shaft and forming the driving means for said shaft, a drum fixed to said shaft and located adjacent said oscillating member, a clutch ring positioned between said oscillating member and drum and being rotatably mounted to have movement independently of said drum and oscillating member, clutch rollers carried by said ring and located within the drum, means within the drum oscillated by said driving member and operating to cam the rollers into engagement with the internal periphery of the drum upon oscillation thereof in one direction, whereby the clutch ring and drum are caused to rotate as a unit producing rotation of said shaft, and resilient means attached to the clutch ring for urging the ring in a direction to return the rollers to initial position when the driving member oscillates in a return direction.

4. A device for converting oscillating motion into intermittent rotary motion including a support having a shaft mounted for rotation therein and adapted to be driven, an oscillating member journalled by said shaft and forming the driving means for said shaft, a drum fixed to said shaft and located adjacent said oscillating member, a clutch ring positioned between said oscillating member and drum and being rotatably mounted to have movement independently of said drum and oscillating member, clutch rollers carried by said ring and located within the drum, means within the drum oscillated by said driving member and operating to cam the rollers into engagement with the internal periphery of the drum upon oscillation thereof in one direction, whereby the clutch ring and drum are caused to rotate as a unit producing rotation of said shaft, a stop adapted to engage the ring for determining the position of the clutch rollers prior to their engagement with the drum, and resilient means attached to the ring yieldingly urging the clutch ring in a direction to hold the same in engagement with said stop.

5. A device for converting oscillating motion into intermittent rotary motion including a support having a shaft mounted for rotation therein and adapted to be driven, an oscillating member journalled by said shaft and forming the driving means for said shaft, a drum fixed to said shaft and located adjacent said oscillating member, a clutch ring positioned between said oscillating member and drum and being rotatably mounted to have movement independently of said drum and oscillating member, clutch rollers carried by said ring and located within the drum, means within the drum oscillated by said driving member and operating to cam the rollers into engagement with the internal periphery of the drum upon oscillation thereof in one direction, whereby the clutch ring and drum are caused to rotate as a unit producing rotation of said shaft, an adjustable stop adapted to engage the clutch ring for determining the position of the rollers prior to their engagement with the drum to thereby vary the speed of the drum, and manual means for varying the position of said stop.

6. A device for converting oscillating motion into intermittent rotary motion comprising a support having a shaft mounted for rotation therein and adapted to be driven, an oscillating member journalled by said shaft and forming the driving means for said shaft, a drum fixed to said shaft and located adjacent said oscillating member, a clutch ring rotatably mounted on said drum, studs fixed to said ring and extending within the drum, a clutch roller loosely carried by each stud, means within the drum oscillated by said driving member and having operation to cam the rollers into engagement with the internal periphery of the drum upon oscillation thereof in one direction, whereby the clutch ring and drum are caused to rotate as a unit producing rotation of the shaft, resilient means attached to the ring urging the ring in a direction to return the rollers to initial position when the driving member oscillates in a return direction, and adjustable means for determining the position of the clutch rollers prior to their engagement with the drum.

7. A device for converting oscillating motion into intermittent rotary motion, comprising a support having a shaft mounted for rotation therein and adapted to be driven, an oscillating member journalled by said shaft and forming the driving means for said shaft, a drum fixed to said shaft and located adjacent said oscillating member, a clutch ring rotatably mounted on said drum, studs fixed to said ring and extending within the drum, a clutch roller loosely carried by each stud, means within the drum oscillated by said driving member and having operation to cam the rollers into engagement with the internal periphery of the drum upon oscillation thereof in one direction, whereby the clutch ring and drum are caused to rotate as a unit producing rotation of the shaft, a rotatable cam on the support providing an adjustable stop, and resilient means attached to the clutch ring urging the ring in a direction to hold the same in engagement with said stop which thereby determines the position of the clutch rollers prior to their engagement with the drum.

SARAH M. CREWDSON.